May 20, 1952  E. MULLEN ET AL  2,597,122
AIR SPRING DUAL WHEEL RUNNING GEAR
Filed Aug. 7, 1946  2 SHEETS—SHEET 1
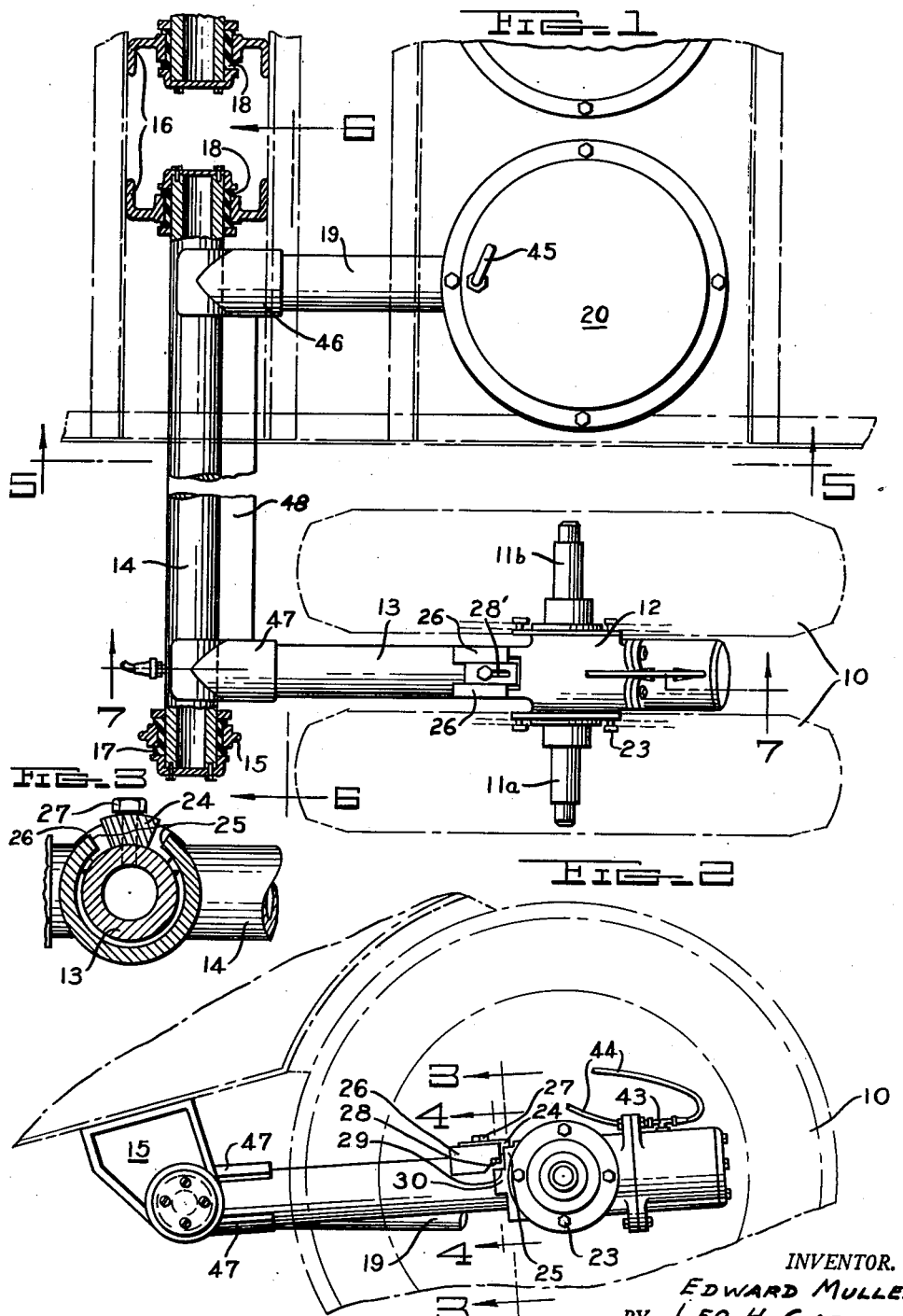
INVENTOR.
EDWARD MULLEN
BY LEO H. GARMAN
ATTORNEYS May 20, 1952     E. MULLEN ET AL     2,597,122
AIR SPRING DUAL WHEEL RUNNING GEAR
Filed Aug. 7, 1946     2 SHEETS—SHEET 2
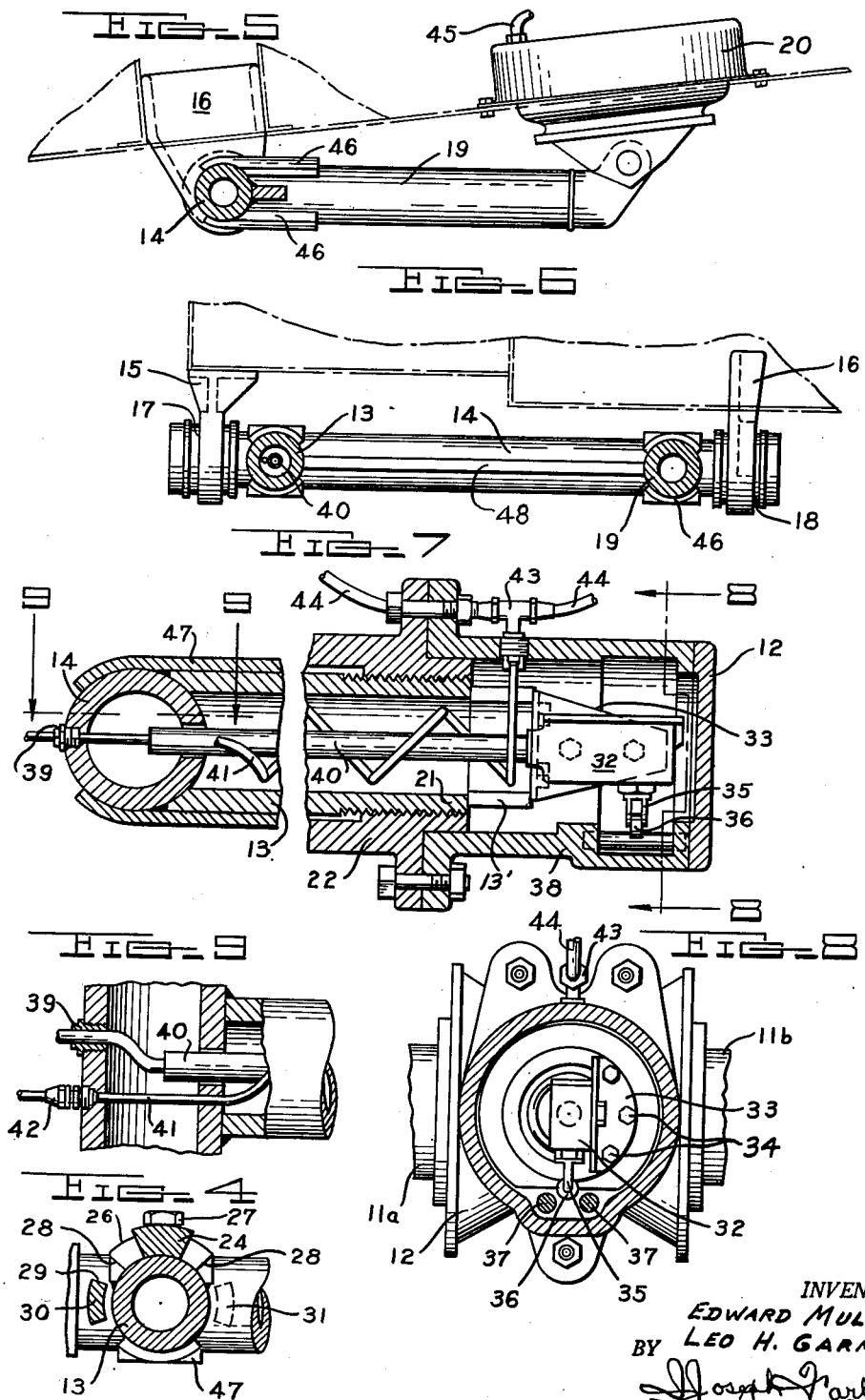
INVENTOR.
EDWARD MULLEN
BY LEO H. GARMAN
ATTORNEYS Patented May 20, 1952

2,597,122

UNITED STATES PATENT OFFICE 2,597,122

AIR SPRING DUAL WHEEL RUNNING GEAR

Edward Mullen and Leo H. Garman, Detroit, Mich., assignors to Mechanical Handling Systems Inc., Detroit, Mich., a corporation of Michigan Application August 7, 1946, Serial No. 688,862

17 Claims. (Cl. 280—124)

This invention relates to a vehicle running gear and more particularly to an improved suspension and spring construction for dual wheels of the type frequently used in pairs on either side of a trailer or other vehicle for transporting heavy loads.

The use of side by side dual wheels in a running gear of the conventional type is accompanied by a number of specific problems including uneven distribution of weight on the respective wheels as a result of variations in road contour or unequal tire pressures, difficulty of access to the inner wheels for servicing tires or brakes, scuffing of tires when the vehicle moves in a curved path and the wheels are required to rotate conjointly, and the inability of the driver to detect soft or flat tires. The more universal problem of providing resilient means for absorbing road shock adaptable to various road and load conditions is likewise present with the use of this type of running gear.

In general, it is the object of this invention to provide an improved running gear construction which will eliminate or satisfactorily meet these various problems in a manner both simple in operation and economical to manufacture.

More specifically, it is an object of this invention to provide a dual wheel running gear with differential means of suspension which will permit the load to be equally distributed to each wheel notwithstanding variations in the contour of road surfaces on which the vehicle travels.

Another object is to provide an axle for a pair of dual wheels which is mounted for limited articulation in a vertical transverse plane about a point centrally located between said wheels whereby said axle will automatically shift its position as required within fixed limits to cause each of the wheels to contact the road surface with equal pressure.

A further object is to make the aforementioned fixed limits retractable in a manner whereby the axle may be rotated 180° when the wheels are jacked up in order to provide ready access to the inner wheel for servicing thereof.

Another object is to provide an axle construction which permits independent rotation of each of a pair of dual wheels in order to avoid scuffing action in rounding curves.

A further object is to provide soft tire signaling means responsive to articulation of the dual wheel axle beyond a predetermined maximum whereby the driver's attention will be drawn to flat or unduly soft tires.

Another object is to provide a construction for a running gear whereby resilient means for absorbing road shock may be remotely located relative to the wheels of a vehicle.

A further object is to provide a construction for a running gear readily adaptable to the use of air springs for such resilient means, the pressure in which may be varied to meet different load and road conditions.

Another object is to provide a construction for wheel suspension whereby the impact from normal road shocks will be transformed into a torsional force on a shaft journaled to the vehicle frame which torsional force may be resisted by remotely located resilient means acting between the frame of the vehicle and a lever arm connected to the mentioned shaft.

A further object is to provide bearings for such shaft which will act to absorb vibration and eliminate frictional rubbing surfaces.

Another object is to provide means for conducting fluid pressure brake leads to the wheels in a manner whereby various movements of the wheel axle relative to the frame of a vehicle will not result in damage to such leads.

A further object is to provide completely independent suspension and spring means for each pair of dual wheels.

These and other objects of the present invention will appear more clearly from the following detailed description of a particular embodiment thereof and from an examination of the drawings forming a part hereof wherein, Fig. 1 is a fragmentary plan view of one side of the running gear assembly.

Fig. 2 is a side elevation of the running gear assembly.

Fig. 3 is an enlarged fragmentary view taken along the line 3—3 of Fig. 2.

Fig. 4 is an enlarged fragmentary view taken along the line 4—4 of Fig. 2.

Fig. 5 is a sectional view taken along the line 5—5 of Fig. 1.

Fig. 6 is a sectional view taken along the line 6—6 of Fig. 1.

Fig. 7 is an enlarged sectional view taken along the line 7—7 of Fig. 1.

Fig. 8 is a sectional view taken along the line 8—8 of Fig. 7.

Fig. 9 is a fragmentary view taken along the line 9—9 of Fig. 7.

Referring to Fig. 1, a pair of wheels are journaled for independent rotation on the non-rotating spindles 11a, 11b of an axle 12 which is pivotally attached in a manner presently to be described to a longitudinally extending tubular member 13. The latter member is, in turn, rigidly connected to a transversely extending shaft 14 which is journaled in brackets 15 and 16 by means of rubber bushings 17, 18 bonded by vulcanizing or other suitable means to the shaft 14 and adjacent surfaces of the brackets 15, 16. A second longitudinally extending member 19 is rigidly attached to the other end of the shaft 14 and is acted upon by an air spring 20, as most clearly shown in Fig. 5. The brackets 15 and 16 and the housing of the air spring 20 are rigidly connected to the framework of a vehicle, shown in phantom, by any suitable means.

It may be seen from the above general description that the weight of the vehicle acting on one end of the tubular member 13 and the supporting force of the wheel axle 12 acting on the other end of such member comprise a couple tending to rotate the shaft 14 in its bearings. Compressed air in the air spring 20 acting on the member 19 resists such rotation and forms a resilient cushion against any road shock transmitted to the wheels 10.

In order to permit the load to be equally distributed between each of the wheels 10, the axle 12 is connected to the member 13 in a manner permitting it to pivot about the axis of the latter member. As shown in Fig. 7, this connection comprises an external thread on the end 21 of the member 13 and an internal thread in the hub 22 of the axle 12 to which the spindles 11a and 11b are rigidly connected on either side. The pivotal movement of the hub relative to the member 13 permitted by this threaded connection in either direction from a normal level position is limited by the engagement of a retractable stop 24 with either of the projecting cooperating surfaces 25 integrally formed in the hub 22. The stop 24 is seated in the keyway formed by the bracket members 26 which are rigidly attached to the tubular member 13. A stud 27 securely holds this stop 24 in position and when such stud is loosened, a longitudinal slot 28' in the stop 24 permits the stop to be retracted to a position where it will not engage the hub surfaces 25. With the stop 24 in retracted position, rotation of the hub 22 relative to the tubular member 13 in one direction continues to be limited by the abutment of cooperating surfaces 28, 29 respectively provided in the bracket 26 and a projecting lug 30 on one side of the hub 22. However, as shown in Fig. 4, 180° rotation of the hub 22 in a counterclockwise direction is possible, in which case, the lug 30 assumes the dotted line position shown at 31. Thus, when access to the inner wheel is required for repairing a tire, brake lining or for other service, the wheels 10 may be jacked up and the inner wheel rotated to the outside. When the inner wheel is thereafter returned to its normal position, the lug 30 makes it necessary for the hub to be turned in a clockwise direction, rather than by completing a 360° rotation in a counterclockwise direction which would have the effect of advancing the longitudinal position of the wheel the distance of one thread from its normal position.

The angular rotation in each direction permitted by the spacing between the movable stop 24 in its normal position and the cooperating surfaces 25 in the hub is sufficient to permit the wheels 10 to follow all normal variations in contour in a road surface while preventing the wheel assembly, as the result of a flat tire or extreme irregularity in the road, from rotating beyond a safe limit.

In order that the driver may be signaled in the event of a flat or soft tire in one of the wheels, an electrical switch is provided in the hub assembly which is actuated when the hub has rotated in either direction from normal beyond a predetermined position within the limits permitted by the stop 24. As shown in Figs. 7 and 8, the switch 32 is mounted on an angle bracket 33 which is in turn secured by studs 34 to a segment 13' of the end of the tubular member 13 projecting within the hub extension 38. An arm 35 of the switch 32 extends downwardly and carries a wheel 36 adapted to contact either of two pins 37 which are seated in the cylindrical extension 38 secured to the hub 22. Upon angular rotation of the hub 22 in either direction from normal position beyond a predetemined extent, such contact actuates the limit switch 32 closing a circuit to an electrical buzzer or signal light positioned to draw the attention of the driver.

The lead wire for the switch 32 passes through an adapter 39 in the forward wall of the transverse shaft 14 and into a tube 40 seated in the opposite wall of the shaft 14. The tube 40 conducts the lead wire to the housing of the limit switch 32. A hydraulic brake line 41 also passes within the tubular member 13 from an adapter 42 secured in the forward wall of the transverse shaft 14 to a T fitting 43 which is seated in the cylindrical extension 38, the brake line 41 being coiled around the tube 40 in a manner permitting the aforementioned 180° angular rotation of the hub 22 relative to the tubular member 13 without damage to such brake line. A pair of branch lines 44 extend from the T fitting 43 to the separate hydraulic brake mechanisms provided for each wheel but not shown in the drawings.

The description thus far has been directed to only one side of the running gear, and it will be understood that a similar independent assembly on the opposite side of the vehicle, a fragmentary portion of which is shown in Fig. 1, completes the running gear.

The air spring 20, the construction of which forms no part of the present invention, for each side of the complete running gear may be supplied through the air line 45 with compressed air from either a common or independent air reservoirs, not shown, in which the air pressure may be regulated in accordance with the particular load and road conditions for maximum smoothness of ride. A one-way check valve interposed in the line 45 permits the air spring and reservoir assembly to perform the function of a shock absorber as well as that of a resilient spring suspension.

From the above description, it will be seen that a running gear is provided which overcomes the principal difficulties which arise in connection with the use of side by side dual wheels. The spring means with this construction may be located toward the center of the vehicle in a protected out-of-the-way position. The bonded rubber bushings 17, 18 provide an extremely effective bearing for the transverse shaft 14 being capable of withstanding torsional strain resulting from spring action without slipping and without requiring lubrication while also further insulating the frame of the vehicle from vibration transmitted to the wheels by small irregularities in the road surface.

Since the principal force transmitted through the connections between the tubular members 13, 19 and the transverse shaft 14 are those incident to the vertical weight of the vehicle, the supporting thrust of the wheels and the resisting thrust of the air spring, reinforcing members 46 and 47 which are welded at the top and bottom of the respective tubular members 19 and 13 and the transverse shaft 14 serve effectively to strengthen these connections. A reinforcing member 48 welded to the tubular members 13, 19 and the cross shaft 14 serves to strengthen the assembly against any side thrust imparted to the wheels. The threaded connection between the tubular member 13 and hub 22 provides an extremely effective supporting connection between these members giving sufficient freedom of rotation for the purposes required while providing great strength and resistance to all other forces transmitted between the respective members.

It will be understood that while this running gear construction was developed primarily to meet the requirements of a dual wheel type of running gear such as extensively used in trailers and similar vehicles which are required to carry heavy loads, many of the advantages of this construction would obtain in its adaptation to a single wheel type of running gear, in which case, a hub could readily be provided which would give the required rigid connection to a member similar to the tube 13.

While a particular embodiment of the present invention has been described herein, it will be understood that many modifications in the detailed construction are possible without departing from the spirit of the invention as set forth in the appended claims.

We claim:

1. A dual wheel suspension for a vehicle having a frame characterized by a dual wheel axle, a hub for said axle intermediate the wheels having a longitudinal axis, a longitudinal member pivotally connected to said hub extending beyond the perimeter of said wheels, a transverse member rigidly associated with said longitudinal member extending laterally past the inner wheel, laterally spaced transverse bearings for said transverse member mounted on the frame of said vehicle and adapted to accommodate articulation of said transverse member, and resilient mechanism for resisting torque imparted to said transverse member by the weight of the vehicle.

2. A vehicle comprising a frame, a pair of wheels at one side of said frame, an axle for said pair of wheels, said axle having a hub intermediate said pair of wheels, a longitudinally extending member pivotally connected at one end to said frame on a substantially transverse axis and pivotally connected at the other end to said hub on a substantially longitudinal axis, said latter connection comprising cooperating internal and external threads on mating cylindrical surfaces, and resilient means for resisting the moment exerted on said longitudinal member by the weight of said vehicle and the supporting force of said hub.

3. A vehicle comprising a frame, a pair of wheels at one side of said frame, an axle for said pair of wheels, said axle having a hub intermediate said pair of wheels, a longitudinally extending member pivotally connected at one end to said frame on a substantially transverse axis and pivotally connected at the other end to said hub on a substantially longitudinal axis, cooperating means between said hub and member for limiting pivotal movement in said latter connection whereby said pair of wheels will be free to articulate in either direction from normal within fixed limits in order to equalize the weight carried by each of said wheels when said vehicle is traveling on a non-level surface, said cooperating limit means being retractable in a manner whereby 180° pivotal movement in said latter connection may be made possible when access to the inner wheel for servicing or the like is desired, and resilient means for resisting the moment exerted on said longitudinal member by the weight of said vehicle and the supporting force of said hub.

4. A vehicle comprising a frame, a pair of wheels at one side of said frame, each of said wheels being provided with a pneumatic tire, an axle for said pair of wheels, said axle having a hub intermediate said pair of wheels, a longitudinally extending member pivotally connected at one end to said frame on a substantially transverse axis and pivotally connected at the other end to said hub on a substantially longitudinal axis, cooperating means between said hub and member for limiting pivotal movement in said latter connection whereby said pair of wheels will be free to articulate in either direction from normal within fixed limits in order to equalize the weight carried by each of said wheels when said vehicle is traveling on a non-level surface, means responsive to a predetermined amount of articulation in either direction from normal within said fixed limits as might result from a flat or soft tire for signaling the driver of said vehicle, and resilient means for resisting the moment exerted on said longitudinal member by the weight of said vehicle and the supporting force of said hub.

5. A vehicle comprising a frame, a pair of wheels at one side of said frame, an axle for said pair of wheels, said axle having a hub intermediate said pair of wheels, a longitudinally extending member pivotally connected at one end to said frame on a substantially transverse axis and pivotally connected at the other end to said hub on a substantially longitudinal axis, cooperating means between said hub and member for limiting pivotal movement in said latter connection whereby said pair of wheels will be free to articulate in either direction from normal within fixed limits in order to equalize the weight carried by each of said wheels when said vehicle is traveling on a non-level surface, an electrical limit switch actuated in response to a predetermined amount of articulation in either direction from normal within said fixed limits as might result from a flat or soft tire, and capable of use in signaling the driver of said vehicle, and resilient means for resisting the moment exerted on said longitudinal member by the weight of said vehicle and the supporting force of said hub.

6. A vehicle comprising a frame, a pair of wheels at one side of said frame, an axle for said pair of wheels, said axle having a hub intermediate said pair of wheels, a longitudinally extending member pivotally connected at one end to said hub on a substantially longitudinal axis, a transversely extending member longitudinally spaced from the center of said wheels and pivotally connected to said frame for articulation about a substantially transverse axis, the other end of said longitudinally extending member being rigidly connected to said transverse member, and resilient means reacting against said frame for resisting the torque imparted to said transverse member as a result of the moment exerted on said longitudinal member by the weight of said vehicle and the supporting force of said hub, the pivotal connections between said transverse member and said frame each comprising adjacent cylindrical surfaces having a fixed relationship respectively with said frame and said transverse member, a rubber bushing interposed between said surfaces and bonded thereto in a manner whereby articulation in said connections is absorbed by said rubber bushing without slippage in the bonded surfaces.

7. A vehicle as set forth in claim 1 wherein each of a pair of wheels is journaled on said axle for independent rotation.

8. A vehicle comprising a frame, a pair of wheels at one side of said frame, an axle for said pair of wheels, said axle having a hub intermediate said pair of wheels, a tubular longitudinally extending member pivotally connected at one end to said frame on a substantially transverse axis and pivotally connected at the other end to said hub on a substantially longitudinal axis, a fluid pressure brake lead coiled within said tubular member, an adapter attached to said hub for receiving one end of said brake lead, an adapter adjacent said first mentioned pivotal connection for receiving the other end of said brake lead, said coiled construction permitting pivotal movement between said hub and tubular member without damage to said brake line, and resilient means for resisting the moment exerted on said longitudinal member by the weight of said vehicle and the supporting force of said hub.

9. A vehicle comprising a frame, a pair of wheels at one side of said frame, an axle for said pair of wheels, said axle having a hub intermediate said pair of wheels, a longitudinally extending member pivotally connected at one end to said hub on a substantially longitudinal axis, a transversely extending member rigidly connected to said longitudinally extending member longitudinally spaced from the center of said wheels and pivotally connected to said frame for articulation about a substantially transverse axis, said pivotal connection between said transverse member and said frame comprising adjacent cylindrical surfaces having a fixed relationship respectively with said frame and said transverse member, a rubber bushing interposed between said surfaces and bonded thereto in a manner whereby articulation in said connection is absorbed by said rubber bushing without slippage in the bonded surfaces, and resilient means for resisting the torque imparted to said transverse member as a result of the moment exerted on said longitudinal member by the weight of said vehicle and the supporting force of said hub.

10. A suspension for the running gear of a vehicle comprising a wheel axle, a longitudinal member having a transverse extension at one end, said longitudinal member being connected to said axle at one end and to a frame member of said vehicle at the other end, said latter connection comprising concentric cylindrical surfaces having a fixed relationship respectively with said frame member and said transverse extension of said longitudinal member, a rubber bushing interposed between said surfaces and bonded thereto in a manner whereby articulation in said connections is absorbed by said rubber bushing without slippage in the bonded surfaces, and means for resisting the moment exerted on said longitudinal member by the weight of said vehicle and the supporting force of said hub.

11. A dual wheel suspension for a vehicle comprising an axle common to a pair of wheels, a load carrying member intermediate said axle and said vehicle, and a pivotal connection between said axle and said intermediate member having a substantially longitudinal axis, said connection comprising cooperating internal and external threads on mating cylindrical surfaces.

12. A dual wheel suspension as set forth in claim 11 wherein cooperating means between said axle and said intermediate member are provided to limit the articulating movement in said pivotal connection within fixed limits.

13. A dual wheel suspension for a vehicle as set forth in claim 11 wherein retractable cooperating means are provided between said axle and said intermediate member for normally limiting the articulating movement in said latter connection between fixed limits but permitting, upon retraction of said limit means, 180° pivotal movement in said connection whereby access to the inner wheel for servicing and the like may be readily effected.

14. A dual wheel suspension for a vehicle having a frame characterized by a dual wheel axle, a hub for said axle intermediate the wheels having a longitudinal axis, a longitudinal member pivotally connected to said hub extending beyond the perimeter of said wheels, a transverse member rigidly associated with said longitudinal member extending laterally past the inner wheel, laterally spaced transverse bearings for said transverse member mounted on the frame of said vehicle and adapted to accommodate articulation of said transverse member, and resilient mechanism for resisting torque imparted to said transverse member by the weight of the vehicle, said resilient mechanism being laterally spaced from said dual wheels, longitudinally spaced from said transverse member and having a longitudinally extending arm rigidly associated with said transverse member adapted to react through said resilient mechanism against said frame.

15. A running gear for a vehicle comprising a frame, a pair of axially aligned wheels on one side of said frame, an axle for said wheels adapted to provide independent rotation, a longitudinal member pivotally connected to said axle on a longitudinal axis intermediate said wheels, said member extending past the perimeter of said wheels, laterally spaced bearings mounted on said frame, a transverse member rigidly connected to said longitudinal member extending laterally past the inner wheel adapted to articulate in said bearings, and resilient mechanism limiting the articulation of said transverse member.

16. A running gear for a vehicle comprising a frame, a pair of axially aligned wheels on one side of said frame, an axle for said wheels permitting independent rotation thereof, a longitudinal bearing for permitting articulation of said wheel axle in a transverse plane, a retractable limit means normally restricting the extent of such articulation, a pair of co-axial laterally spaced bearings rigidly associated with said frame, the axis of which extends transversely past the perimeter of said wheels, a member extending between said first-named bearing and said laterally spaced bearings defining a path of articulation for said wheel axle about the axis of said laterally spaced bearings, and resilient means reacting against said frame for resisting the last-mentioned articulation in the direction induced by the weight of said vehicle.

17. A running gear for a vehicle comprising a frame, a pair of axially aligned wheels on one side of said frame, an axle for independent rotation of said wheels, a hub on said axle between said wheels having a longitudinal axis for rotation, a member rotatable in said hub extending longitudinally beyond the perimeter of said wheels, a transverse shaft rigidly connected to said longitudinal member extending laterally past the inner of said wheels, a pair of laterally spaced bearings for said shaft rigidly associated with said frame, a longitudinally extending arm rigidly associated with the inner end of said shaft, and resilient means between said frame and a portion of said arm spaced from the axis of said shaft.

EDWARD MULLEN.
LEO H. GARMAN.

REFERENCES CITED

The following references are of record in the file of this patent:

UNITED STATES PATENTS

| Number | Name | Date |
| --- | --- | --- |
| 897,270 | Chapin | Sept. 1, 1908 |
| 1,824,096 | Orsett | Sept. 22, 1931 |
| 2,023,135 | Hawkins | Dec. 3, 1935 |
| 2,053,447 | Sargent | Sept. 8, 1936 |
| 2,059,908 | Rabe | Nov. 3, 1936 |
| 2,109,311 | Dayton | Feb. 22, 1938 |
| 2,121,862 | Dodge | June 28, 1938 |
| 2,172,177 | Rose | Sept. 5, 1939 |
| 2,311,252 | Reid | Feb. 16, 1943 |
| 2,395,640 | Pearson | Feb. 26, 1946 |
| 2,426,360 | Larison | Aug. 26, 1947 |
| 2,442,354 | Gordon, Jr., et al. | June 1, 1948 |